Oct. 5, 1954                R. L. DEAN                 2,690,621
QUESTION AND HIDDEN ANSWER DEVICE
Filed Feb. 5, 1952                               2 Sheets-Sheet 1
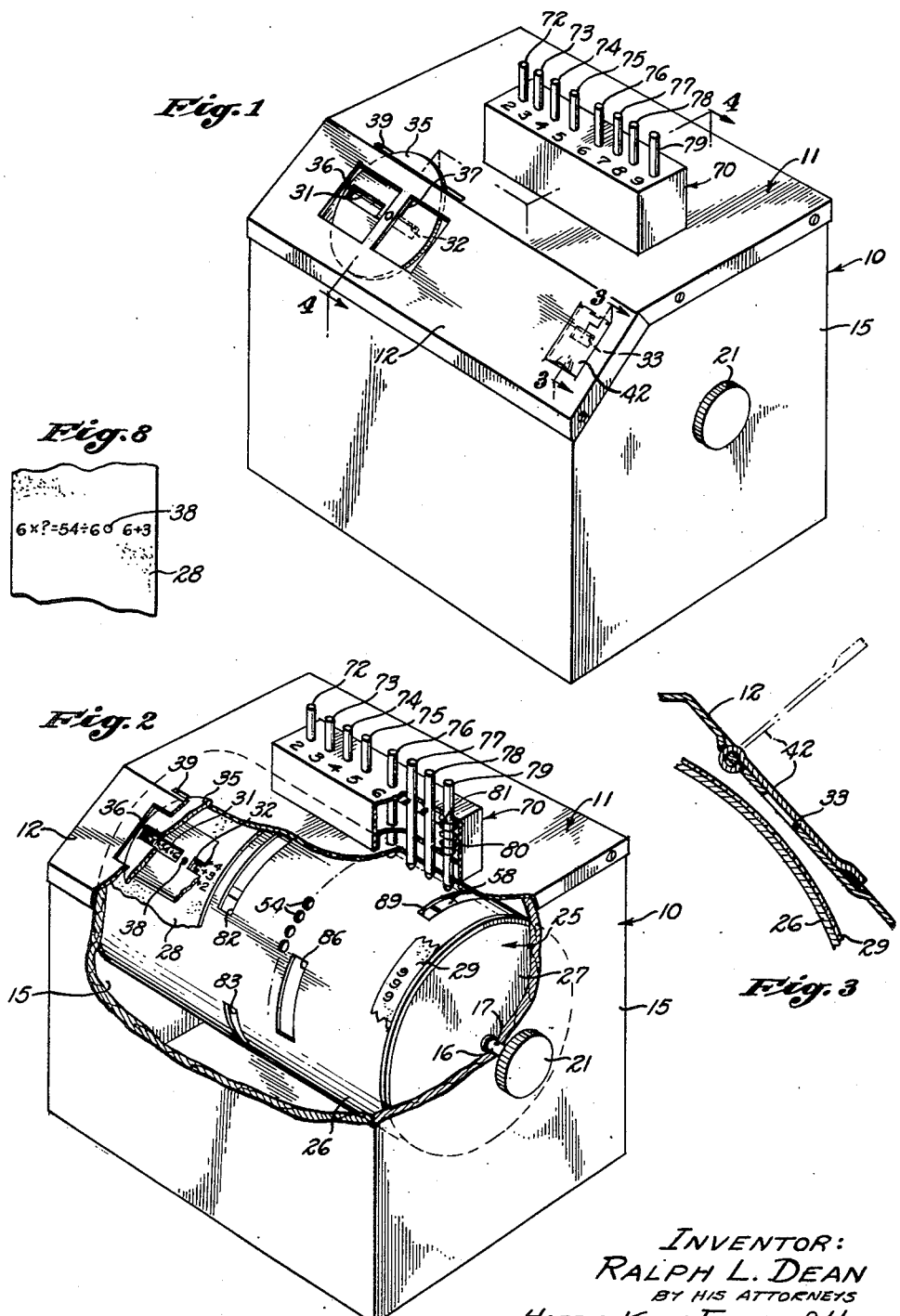
INVENTOR:
RALPH L. DEAN
BY HIS ATTORNEYS
HARRIS, KIECH, FOSTER & HARRIS Oct. 5, 1954   R. L. DEAN   2,690,621
QUESTION AND HIDDEN ANSWER DEVICE
Filed Feb. 5, 1952   2 Sheets-Sheet 2
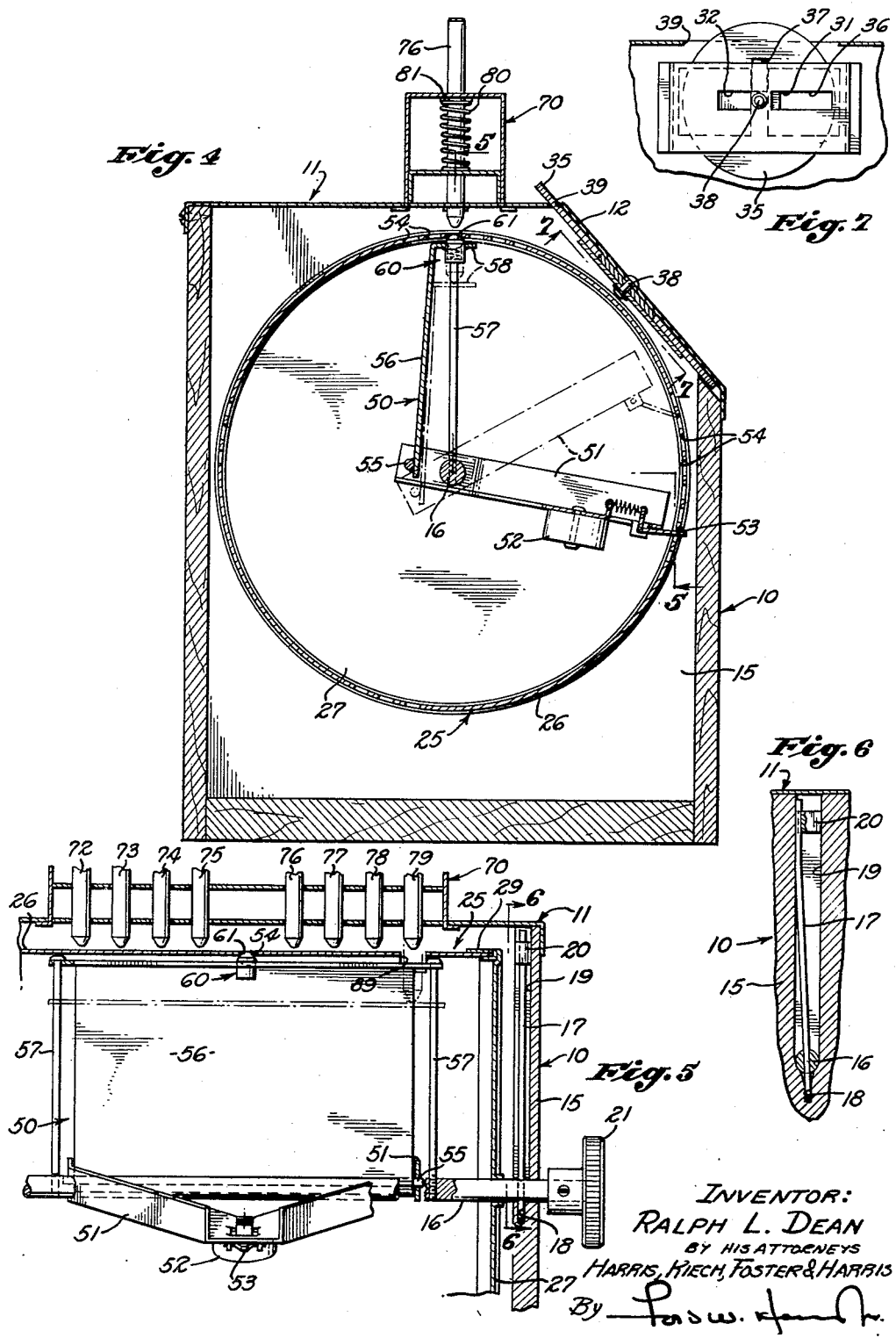

Patented Oct. 5, 1954

2,690,621

UNITED STATES PATENT OFFICE 2,690,621

QUESTION AND HIDDEN ANSWER DEVICE

Ralph L. Dean, Altadena, Calif.

Application February 5, 1952, Serial No. 269,997

16 Claims. (Cl. 35—9)

The present invention relates to an educational or testing device which may be used by a student for self-teaching and self-drilling in any one of a variety of subjects, such as arithmetic, history, music, or the like, or which may be used to test the student's knowledge of the foregoing or other subjects. As a matter of convenience, the invention will be considered herein as embodied in an educational device for self-drilling in such branches of arithmetic as multiplication, division, addition, and subtraction, it being understood that other types of problems, such as true or false questions, or multiple choice questions, may be substituted for the arithmetic problems without departing from the spirit of the invention. Also, it will be understood that it is within the scope of the invention to provide a device which may be used in tests to determine a student's knowledge of a particular subject.

In general, a primary object of the invention is to provide a device which includes a cylindrical rotor or drum which is mounted in a housing and which carries the problems or questions to be answered on its peripheral wall so that one question at a time may be viewed through a window in the housing. Preferably, the answers to the problems or questions are also carried on the peripheral wall of the drum in alignment with the respective problems or questions, and are visible one at a time through another window in the housing, the latter window normally being covered so that the student consults it only as a last resort.

Another object is to provide an actuating means for rotating the drum so as to bring different questions into registry with the question window in the housing.

Another object is to provide a device which includes keys, or equivalent elements, respectively corresponding to the possible answers to the questions and adapted to operate the actuating means for rotating the drum, an important related object being to provide a device wherein only the key corresponding to the correct answer to a particular question is capable of operating the actuating means. With this construction the drum remains stationary until the key corresponding to the correct answer has been operated, irrespective of the number of keys which the student may have to operate before operating the right one.

The present invention thus automatically indicates whether a given answer is right or wrong and it is unnecessary to check the answers, thus saving considerable time over conventional procedures. Also, paper, pencils, and the like, are unnecessary, thus effecting a saving in materials.

An important object of the invention when embodied in an educational device for self-drilling is to provide an actuating means for advancing the drum in random fashion so that the student cannot answer successive questions by memorizing an answer pattern. For example, if the device is used in connection with the multiplication tables, advancing the drum in random fashion avoids presenting in sequence such problems as $2 \times 8$, $3 \times 8$, $4 \times 8$, etc. However, if the device is being used as a testing device with a series of problems or questions to be answered in a test of the student's knowledge, it may be desirable to employ an actuating means for the drum which advances the drum step by step in a controlled manner.

Another advantage of the present invention when embodied in an actuating means for advancing the drum in random fashion is that the device may be operated endlessly without any necessity for resetting the device to a starting position after the completion of one cycle, this being an important feature.

Considering the present invention in more detail, it preferably includes a housing which completely encloses the drum and the mechanism associated therewith. An important object of the invention is to provide a stationary shaft on which the drum is rotatably mounted and on which the actuating means for advancing the drum is mounted entirely within the drum. This construction results in an extremely compact device, which is an important feature.

Another object is to provide a device wherein the keys for operating the actuating means to advance the drum are carried by the housing and are insertable into the interior of the drum into engagement with the actuating means through apertures in the peripheral wall of the drum, such apertures being so located on the peripheral wall of the drum that, when a particular question is before the question window in the housing, the corresponding aperture is in registry with the key corresponding to the correct answer so that depression of such key moves it into engagement with the actuating means to advance the drum to some other question. With this construction, if the student depresses the wrong key, it merely engages the peripheral wall of the drum and cannot engage the actuating means for rotating the drum so that the drum is advanced by the actuating means only when the correct key is depressed, i. e., only when the key corresponding to the correct answer to the question is depressed.

The apertures in the peripheral wall of the drum may be individual holes corresponding to the individual questions to be answered, or, if the questions or problems may be grouped in such a way that a common answer suffices for each question in the group, then circumferentially extending slots common to the questions of the respective groups may be employed.

An important object of the invention is to provide an actuating means carried by the stationary shaft which is gravity operated so as to provide a very simple drive for the rotor or drum. A related object is to provide an actuating means including an element which is elevated when the correct key is depressed and which returns to its original position under the influence of gravity and, in so doing, advances the drum to some new position.

Another object of the invention is to provide indexing means engageable with the drum for stopping or positioning the drum in positions such that the questions on the drum are properly aligned with the question window in the housing. A related object is to integrate the actuating means for rotating the drum and the indexing means for positioning it into one mechanism by mounting the indexing means on the actuating means, which is an important feature.

Another object is to provide means for adjusting the angular position of the stationary shaft so as to produce proper registry between the questions on the drum and the question window, a related object being to provide an adjusting means which includes a flexible element connected to and extending radially from the stationary shaft and a cam for bending the flexible element to produce a shift in the angular position of the stationary shaft, such cam being movable relative to the housing.

Another object is to provide a device which is particularly useful for arithmetic problems and which includes two or more question windows any one of which may be brought into operation by a rotatable selector carried by the housing, such selector preferably having the form of a rotatable disc provided with windows therein which may be caused to register selectively with the question windows in the housing as desired.

The foregoing objects and advantages of the present invention, together with various other objects and advantages which will become apparent, may be attained with the exemplary embodiment of the invention which is illustrated in the accompanying drawings and which is described in detail hereinafter. Referring to the drawings:

Fig. 1 is a perspective view of a device embodying the present invention;

Fig. 2 is a view similar to Fig. 1 with parts of a housing of the device broken away to reveal the interior of the device;

Figs. 3 and 4 are sectional views respectively taken along the arrowed lines 3—3 and 4—4 of Fig. 1;

Fig. 5 is a fragmentary sectional view taken along the arrowed line 5—5 of Fig. 4;

Fig. 6 is a fragmentary sectional view taken along the arrowed line 6—6 of Fig. 5;

Fig. 7 is a fragmentary sectional view taken along the arrowed lines 7—7 of Fig. 4; and Fig. 8 is a fragmentary view of a tape having possible arithmetic questions or problems thereon.

In general, the device of the invention which is illustrated in the drawings includes a case or housing 10 which serves as a support for the elements of the device which will be described hereinafter, the housing being provided with a cover 11 which has a sloping front wall 12.

Carried by the housing 10, as by being inserted into holes in end walls 15 thereof, is a stationary shaft 16, this shaft being held stationary by an element, such as pin 17, Figs. 5 and 6, which extends radially through the shaft 16 into a hole 18 provided in the housing on one side of the shaft. Provided in the housing 10 on the opposite side of the shaft 16 is a groove 19 for the pin 17, the pin being formed of wire, or other flexible material, so that it may be bent or flexed to rotate the shaft 16 slightly for adjustment purposes, as will be discussed hereinafter. The pin 17 is adapted to be flexed by a cam 20 which engages the pin and which is slidable in the groove 19. As will be apparent, if the cam 20 is moved downwardly from the position shown in Figs. 5 and 6, the pin 17 will be flexed to the left slightly to adjust the angular position of the shaft 16 in a counterclockwise direction. One end of the shaft projects from the housing 10 and is provided with a knob 21 thereon for an additional adjustment, as will be discussed hereinafter.

Disposed within the housing 10 and rotatably mounted on the stationary shaft 16 is a cylindrical rotor or drum 25 having a circumferential or peripheral wall 26 and end walls 27, the latter serving to rotatably mount the drum on the shaft 16. The problems or questions to be answered and the answers thereto are carried by the peripheral wall 26 of the drum 25. If desired, the questions and answers may be printed directly on the peripheral wall of the drum, may be printed on tapes secured to the peripheral wall of the drum, or may be mounted on the peripheral wall of the drum in any other suitable manner. In the particular construction illustrated, the problems or questions are carried by a tape 28 at one end of the drum and the answers are carried by a tape 29 at the other end of the drum.

In the particular construction illustrated, the question tape 28 carries a plurality of arithmetic problems, an example being shown in Figs. 2 and 8. One of the problems is 6 × ? = 54 the answer to which is, of course, 9, the numeral 9 appearing on the answer tape 29 opposite the question on the question tape 28. The example in Fig. 8 also includes the problems 54 ÷ 6 and 6 + 3, the answers to which are again 9. Thus, the single line of symbols shown in the example of Fig. 8 represents three separate problems, each of which has the answer 9, which answer appears on the answer tape 29 in alignment with the corresponding set or group of problems on the question tape 28. It will be understood that the question tape 28 may be provided with a plurality of circumferentially spaced lines, each having similar problems in multiplication, division and addition or subtraction, corresponding portions of the answer tape 29 having the answers thereon.

As best shown in Figs. 1 and 2, the front wall 12 of the cover 11 has two aligned question windows 31 and 32 and an answer window 33 therein, the question windows 31 and 32 registering with different portions of the question tape 28 and the answer window 33 registering with the answer tape 29. Rotatably mounted on the front wall 12 of the cover 11 is a disc 35 having question windows 36 and 37 therein, Fig. 7, which may be rotated into registry with the question windows 31 and 32. The question window 36 in the disc 35 is adapted to register with that portion of the question window 31 which is in registry with the problem 6 × ? = 54 in the example of Fig. 8. The question window 37 in the disc 35 is adapted to register with that portion of the question window 31 which registers with the problem 54 ÷ 6 in the example of Fig. 8, and, by rotating the disc 35, the question window 37 may be made to register with the question window 32 to pick up the problem 6 + 3 in the example of Fig. 8. In order to accomplish this, the disc 35 is rotatably mounted on a pin 36 carried by the wall 12 of the cover 11 and positioned relative to the question tape 28 at a point between the two problems 6 × ? = 54 ÷ 6 and the problem 6 + 3, as best shown in Fig. 8.

Thus, by rotating the disc 35 until the desired one of the question windows 36 and 37 therein is in registry with the desired one of the question windows 31 and 32 in the front wall 12 of the cover 11, any one of three problems may be presented to the student for each position of the drum 25, it being understood that the number of sets of problems on the question tape 28 is limited only by the circumference of the drum 25. In order to permit rotation of the disc 35 to present different problems of each set to the student, one edge of the disc projects through a slot 39 in the cover 11, the edge of the disc preferably being knurled or roughened to render the disc rotatable by the fingertips. However, a knob, not shown, may be connected to the disc.

The answer window 33 in the front wall 12 of the cover 11 is normally covered by a hinged flap 42, Fig. 3, which is carried by the cover. If the student cannot determine the answer to a particular question or problem any other way, he may raise the flap 42 so that the answer is visible through the answer window 33.

The discussion thus far has been limited to a general consideration of the drum 25, a consideration of possible questions or problems, and the answers thereto, on the drum, and a consideration of the manner in which different problems of a group may be presented by means of the rotatable disc 35. The manner in which the correct answer to a given problem is indicated, and the manner in which the drum is advanced to present another problem, or set of problems, will be considered in detail in the following paragraphs.

Referring particularly to Figs. 4 and 5 of the drawings, the educational device of the invention includes an actuating means 50 for advancing the drum 25 in random fashion, so as to avoid presenting successive sets of problems on the question tape 28 to the question windows 31 and 32. In other words, the actuating means may at times advance the question tape 28 one space, or a few spaces, or it may advance the question tape several spaces, depending upon how the actuating means is operated, as will be discussed hereinafter. Considering the actuating means 50 in more detail, it includes a first, pivoted element 51 which is pivoted on the stationary shaft 16 within the drum 25, the entire actuating means 50 being carried by the shaft within the drum. The first element 51 carries a weight 52 on one side of the shaft 16, the first element being gravity biased in the clockwise direction in the particular construction illustration and as viewed in Fig. 4 of the drawings. The first element 51 carries a spring-biased pawl 53 which is engageable with holes 54 in the peripheral wall 26 of the drum 25, the holes 54 being arranged in a row extending entirely around the circumference of the drum. During counterclockwise rotation of the first element 51, the pawl 53 pivots freely so that it does not rotate the drum 25. However, when the first element 51 pivots in the clockwise direction from the position shown in phantom in Fig. 4 to the position shown in solid lines therein, the pawl is inserted into one of the holes 54 and rotates the drum 25 in the clockwise direction as viewed in Fig. 4.

Pivotally connected to the first element 51 at 55 is a second element 56 which is constrained to move generally vertically by guides 57 extending radially upwardly from the shaft 16 and extending through holes in a flange 58 at the upper end of the second element 56. As will be apparent, if the second element 56 is moved downwardly into the position shown in phantom, it rocks the first element 51 upwardly into the position shown in phantom, the pawl 53 pivoting freely during such movement to prevent rotation of the drum. If the second element 56 is now released, the weight 52 causes the first element 51 to drop, i. e., rotate in the clockwise direction, whereupon the pawl 53 engages in one of the holes 54 to rotate the drum 25. The angle through which the drum is rotated depends, of course, on the amount that the second element 56 is depressed, and on the suddenness with which it is released, as will be discussed in more detail hereinafter.

The actuating means 50 carries an indexing means 60 for accurately positioning the drum 25 in any one of a plurality of positions, one of the sets of problems on the question tape 28 being in alignment with the question windows 31 and 32, and the corresponding answer being in alignment with the answer window 33, for each position of the drum 25. The indexing means 60 is shown as including a spring-biased detent 61 which is insertable into one of the holes 54 previously described to accurately position the drum. As will be apparent, by mounting the indexing means 60 on the flange 58 of the actuating means 50, when the second element 56 is depressed to operate the actuating means 50, the indexing means 60 is automatically disengaged from the drum so that the drum can spin freely until such time as the indexing means 60, or, more specifically, the detent 61, re-engages the drum. Ultimately, the drum will come to rest with the detent 61 in one of the holes 54 to accurately position the drum. In the event that the detent 61 does not enter one of the holes 54 when the drum 25 comes to rest for any reason, the position of the shaft 16 may be adjusted angularly slightly by means of the knob 21 to bring the detent 61 into the nearest hole 54, the flexible pin 17 permitting the necessary slight angular adjustments of the shaft 16. However, it is ordinarily unnecessary to adjust the shaft angularly by means of the knob 21 for this purpose since the detent 61 fails to enter one of holes 54 only on rare occasions.

If, with the detent 61 in one of the holes 54, the corresponding set of questions on the question tape 28 is not precisely in registry with the question windows 31 and 32, the position of the shaft 16 may be adjusted angularly as required to attain the necessary registry by moving the cam 20 up or down to provide the flexible pin 17 with the necessary degree of flexure. Thus, any inaccuracies in alignment of parts can be compensated for by means of the cam 20 and the flexible pin 17 which it engages, this being an important feature.

Considering now the manner in which the actuating means 50 is operated, the cover 11 carries a support 70 for keys 72 to 79, there being eight keys in the particular construction illustrated to correspond to the multipliers 2 through 9 in the multiplication table, it being considered unnecessary to use the multiplier 1. The keys 72 to 79 extend through holes in the support 70 and in the cover 11, which holes serve as guides to limit the movement of the keys to reciprocatory movement. Each key is biased upwardly by a spring 80, each spring being seated on a portion of the support 70 at one end and being seated against a pin 81 through the corresponding key at its other end.

The drum 25 is provided in its peripheral wall 26 with a plurality of axially and circumferentially spaced apertures which are adapted to register with the keys 72 to 79, respectively. Visible in Fig. 2 are apertures 82, 83, 86 and 89 respectively corresponding to the keys 72, 73, 76 and 79. Each aperture corresponds to a group of problem sets on the question tape 28 having a common multiplier. For example, the aperture 82 corresponds to a multiplier of 2 and, when any of a plurality of sets of problems having the common answer 2 is before the question windows 31 and 32, the corresponding aperture 82 is in registry with the key 72. The same relation applies for the remaining keys and apertures and groups of problem sets on the question tape 28. However, while apertures corresponding to a group of problems or questions have been shown, individual holes for each question or group of questions may be employed if desired.

When one of the apertures is in registry with the corresponding one of the keys 72 to 79, such key may be inserted through the aperture in registry therewith into the interior of the drum 25, insertion of any other keys into the interior of the drum being prevented by the peripheral wall 26 of the drum. The flange 58 of the second element 56 of the actuating means 50 is positioned in registry with the keys 72 to 79 so that any key inserted through the corresponding one of the apertures 82, etc., engages the flange 58 to depress the second element 56, thereby operating the actuating means 50 in the manner hereinbefore described.

It will be understood that only one of the apertures 82, etc., is in registry with the corresponding one of the keys 72 to 79 at any one time, such aperture corresponding to the question or problem which is in registry with the question windows 31 and 32. Thus, the actuating means 50 can be operated only by the key corresponding to the correct answer to the question or problem before the question windows. Consequently, the actuating means 50 can be operated to advance the drum 25 to another question only if the key corresponding to the right answer is depressed. Depressing any wrong keys, i. e., keys corresponding to wrong answers, will not result in operation of the actuating means 50 since such wrong keys merely engage the peripheral wall 26 of the drum 25, which is an important feature.

Considering the operation of the invention, it will be assumed that the necessary adjustments have been made so that the device is ready for use. Also, it will be assumed that the set of problems shown in Fig. 8 is in registry with the question windows 31 and 32, the answer to any one of the three problems in this set being 9. In other words, irrespective of whether the question window 36 in the disc 35 is in registry with the question window 31, and irrespective of whether the question window 37 in the disc is in registry with the question window 31 or the question window 32, the answer is 9. Under such conditions, the aperture 89 in the drum 25 is in registry with the key 79 corresponding to the answer 9. Thus, if the student using the device knows that the answer is 9, he depresses the key 79, whereupon this key operates the actuating means 50 to advance the drum to the next question. More particularly, the depressed key 79 passes through the aperture 89 into engagement with the flange 58, whereupon the depressed key 79 moves the second element 56 downwardly to rock the first element 51 upwardly, the pawl 53 passing freely over the holes 54 during such upward movement of the first element 51. When the key 79 is released, the weight 52 causes the first element 51 to drop, and the pawl 53 engages one of the holes 54 to rotate the drum 25, the amount that the drum 25 rotates depending upon the amount the key 79 is depressed and the suddenness with which it was released. It will be noted that, when the second element 56 is lowered, the indexing means 60 disengages the drum 25 so that the drum can rotate freely. When the first element 51 drops in advancing the drum 25, the indexing means 60 is brought back into engagement with the drum, whereupon the detent 61 ultimately enters one of the holes 54 when the drum comes to rest to properly index the drum.

The device operates in a similar way whenever any key corresponding to a correct answer is depressed. If a key corresponding to an incorrect answer to the particular question being considered is depressed, such key merely engages the peripheral wall 26 of the drum 25 and nothing happens. Then the student must try again until ultimately the correct answer is indicated by his depressing a key which goes through the drum to operate the actuating means 50, thereby shifting the drum to a new question.

If a student is interested only in multiplication problems, he will set the window 36 in the disc 35 in registry with the window 31 and will leave it there until he is through with multiplication problems. If he is interested in division problems, or addition or subtraction problems, the window 37 in the disc is set in the appropriate position. Thus, whichever type of problem the student is interested in, he may continue his self-drilling in the manner hereinbefore discussed as long as he likes, there being no necessity at any time for resetting the machine since the device has no fixed starting point. The random advance provided by the actuating means 50 is particularly valuable in problems in multiplication, division, addition or subtraction since it requires the student to get the answer without being able to go through in a sequence such as $2 \times 8$, $3 \times 8$, $4 \times 8$, $5 \times 8$, etc.

While the present invention has been considered herein in connection with arithmetic problems, it will be understood that it may be used for a wide variety of problems, such as problems requiring true or false answers, problems having multiple choice answers, and the like. Consequently, it will be understood that I do not desire to be limited to the particular embodiment hereinbefore disclosed, but desire to reserve any changes, modifications and substitutions which properly come within the scope of the invention.

I claim as my invention:

1. In an educational device, the combination of: a support; a rotor carried by said support; at least two keys carried by said support; and means entirely within said rotor and including an element engageable with said rotor and an element engageable by said keys for rotating said rotor, the element last mentioned being movable varying distances by said keys.

2. In an educational device, the combination of: a support; a rotor carried by said support; at least two keys carried by said support; and means entirely within said rotor and engageable by said keys and having a lost motion connection with said rotor for rotating said rotor in random fashion.

3. In an educational device, the combination of: a support; a shaft carried by said support; a rotor carried by said shaft; at least two keys carried by said support; and actuating means carried by said shaft and engageable by said keys and engageable with said rotor for rotating said rotor in random fashion, said means being entirely within said rotor.

4. In an educational device, the combination of: a support; a cylindrical rotor carried by said support and having at least two apertures therein; at least two keys carried by said support and respectively insertable through said apertures into the interior of said rotor when said rotor is in positions such that said apertures register with said keys; and means entirely within said rotor and engageable by said keys and engageable with said rotor for rotating said rotor.

5. An educational device as set forth in claim 4 wherein the means for rotating said rotor includes: a pivoted element carried by said support; gravity responsive means carried by said pivoted element for rotating said pivoted element in one direction; a pawl carried by said pivoted element and engageable with said rotor; and an element pivotally connected to said pivoted element and engageable by said keys for pivoting said pivoted element in the opposite direction.

6. In an educational device, the combination of: a housing; a stationary shaft disposed within and carried by said housing; a cylindrical rotor disposed within said housing and carried by said shaft, the periphery of said rotor having at least two apertures therein; at least two keys carried by said housing adjacent said rotor and insertable into the interior of said rotor through said apertures therein, respectively, when said rotor is in positions such that said apertures register with said keys; and means carried by said shaft within said rotor for rotating said rotor, said means being engageable by said keys and being engageable with said rotor.

7. An educational device according to claim 6 wherein said means includes: a first element pivotally mounted on said shaft and pivotable in one direction by a weight thereon; a pawl carried by said first element and engageable with said rotor; and a second element pivotally connected to said first element and engageable by said keys to pivot said first element in the opposite direction.

8. An educational device according to claim 6 including indexing means engageable with said rotor for positioning said rotor in any one of a plurality of predetermined positions.

9. An educational device as defined in claim 6 including indexing means carried by said means for rotating said rotor for positioning said rotor in any one of a plurality of positions, said indexing means being engageable with said rotor.

10. An educational device according to claim 6 including means for angularly adjusting said shaft relative to said housing, said adjusting means including an element connected to and extending radially from said shaft and including means for flexing said element to adjust said shaft angularly.

11. In an educational device, the combination of: a housing; a stationary shaft carried by and extending through said housing; a cylindrical rotor disposed within said housing and having peripheral and end walls, said rotor being rotatably mounted on said shaft, which extends axially through said rotor and through said end walls thereof, said peripheral wall of said rotor having at least two longitudinally and circumferentially spaced apertures therein; at least two keys carried by said housing and insertable through said apertures, respectively, into the interior of said rotor when said rotor is in positions such that said apertures register with said keys, respectively; and actuating means pivotally mounted on said shaft and engageable by said keys and engageable with said rotor for rotating said rotor, said actuating means being disposed entirely within said rotor.

12. An educational device as defined in claim 3 including indexing means carried by said actuating means and engageable with said rotor for positioning said rotor in any one of a plurality of positions.

13. An educational device as defined in claim 12 wherein said support is a housing enclosing said rotor and said actuating and indexing means and at least substantially enclosing said shaft, said housing having windows therein through which an indicia-carrying surface of said rotor may be viewed, and said housing carrying a movable viewing element having windows therein, said viewing element being movable to bring a selected one of the windows therein into registry with a selected one of the windows in said housing.

14. An educational device as defined in claim 13 including means for angularly adjusting said shaft, whereby said indexing means angularly adjusts the position of said rotor to align any desired portion thereof with one of said windows in said housing.

15. An educational device as defined in claim 14 wherein said adjusting means includes a flexible element connected to and extending radially from said shaft and includes cam means engaging said housing and said flexible element for bending said flexible element to angularly adjust the position of said shaft.

16. In an educational device, the combination of: a stationary shaft; a rotor carried by said shaft; a first element pivoted on said shaft; a weight carried by said first element for biasing said first element in one direction; a pawl carried by said first element and engageable with said rotor; and a second element extending generally transversely of said first element and pivotally connected thereto for rocking said first element.

References Cited in the file of this patent

UNITED STATES PATENTS

| Number | Name | Date |
|---|---|---|
| 716,631 | Gallagher | Dec. 23, 1902 |
| 724,392 | Hurd | Mar. 31, 1903 |
| 1,121,867 | Reeves | Dec. 22, 1914 |
| 1,728,630 | Sanderson | Sept. 17, 1929 |
| 1,749,226 | Pressey | Mar. 4, 1930 |
| 1,842,150 | De Lane | Jan. 19, 1932 |
| 2,157,058 | Ray | May 2, 1939 |
| 2,317,107 | Desch | Apr. 20, 1943 |

FOREIGN PATENTS

| Number | Country | Date |
|---|---|---|
| 398,626 | Germany | July 14, 1924 |